United States Patent
Grosvenor

(10) Patent No.: US 8,189,916 B2
(45) Date of Patent: May 29, 2012

(54) IMAGE PROCESSING METHOD, SYSTEM, AND COMPUTER READABLE MEDIUM

(75) Inventor: David Grosvenor, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 945 days.

(21) Appl. No.: 12/184,247

(22) Filed: Jul. 31, 2008

(65) Prior Publication Data

US 2009/0034842 A1    Feb. 5, 2009

(30) Foreign Application Priority Data

Jul. 31, 2007   (GB) .................................. 0714919.8

(51) Int. Cl.
*G06K 9/34* (2006.01)
(52) U.S. Cl. .................. 382/173; 382/199; 382/284
(58) Field of Classification Search ............... 382/199, 382/100, 254, 284
See application file for complete search history.

(56) References Cited

U.S. PATENT DOCUMENTS

| | | | | |
|---|---|---|---|---|
| 5,978,519 A * | 11/1999 | Bollman et al. | ............ | 382/282 |
| 7,133,571 B2 * | 11/2006 | Cheatle | ............ | 382/282 |
| 7,162,102 B2 * | 1/2007 | Cahill et al. | ............ | 382/288 |
| 7,529,390 B2 * | 5/2009 | Zhang et al. | ............ | 382/118 |
| 7,869,658 B2 * | 1/2011 | Blose et al. | ............ | 382/224 |
| 2005/0276477 A1 * | 12/2005 | Lin et al. | ............ | 382/173 |

* cited by examiner

*Primary Examiner* — Stephen R Koziol

(57) ABSTRACT

Provided is a method of generating a set of cropped images from an image selection comprising:
  generating a plurality of sets of crops from the image selection;
  calculating a cropping risk for each set of crops in the plurality of sets of crops by comparing the crops with the image selection, the cropping risk being a measure of lost information for the set of crops from the image selection;
  calculating a goal measure for each set of crops in the plurality of sets of crops from the emphasis of at least one subject in the image selection;
  selecting a set of crops as the set of cropped images based on a comparison of the cropping risk and the goal measure for each of the sets of crops.

20 Claims, 8 Drawing Sheets

IMAGE PROCESSING METHOD, SYSTEM, AND COMPUTER READABLE MEDIUM

RELATED APPLICATIONS

The present application is based on, and claims priority from, United Kingdom Application Number 0714919.8, filed Jul. 31, 2007, the disclosure of which is hereby incorporated by reference herein in its entirety.

FIELD OF THE INVENTION

The invention relates generally to the field of digital image processing, and more particularly to the cropping of digital images.

BACKGROUND OF THE INVENTION

Cropping is the process of selecting an area of an image and discarding the remainder of the image. Cropping allows the subjects of photographs such as people to be emphasized in the photographs. Cropping also allows the aspect ratio of images to be changed. The process of cropping an image involves balancing the increase in emphasis with the information lost in the discarded region of the image. Manually cropping digital images can be a time consuming process, therefore computer implemented automatic cropping methods have been developed. For example, U.S. Pat. No. 6,654,506 discloses a; method and computer program for cropping a digital image which involves inputting a belief map of a photographic image, selecting a zoom factor and a crop window, clustering regions of the belief map to identify background portions, secondary portions and main portions, positioning a crop window such that the crop window is centered around a main portion having a highest belief value, moving the crop window such that the crop window is included completely within the image, moving the crop window such that the sum of belief values is at a maximum and cropping the image according to the crop window. The belief value at a location in the belief map indicates the importance of a photographic subject at the same location in the photographic image.

US2002/019861 discloses an apparatus and a method of using an electronic camera to capture and crop electronic images. An electronic imaging device processes the electronic image to identify one or more features relevant to the composition of the electronics image, each such feature having one or more compositionally significant properties from amongst a plurality of different predetermined compositional properties, and each such feature occupying a sub-region of the electronic image. Then the device selects one or more compositional rules from a set of predetermined compositional rules, based on the relevance of the compositional rules to the compositionally significant properties of one or more of the identified features. Then the device determines one or more suitable crop boundaries for applying one or more of the selected compositional rules.

SUMMARY OF THE INVENTION

According to an embodiment of the invention there is provided a method of generating a set of cropped images from an image selection. The method comprises generating a plurality of sets of crops from the image selection, and calculating a cropping risk for each of the sets of crops in the plurality of sets of crops by comparing the crops with the image selection. The cropping risk is a measure of the lost information for the sets of crops from the image selection. The method further comprises calculating a goal measure for each set of crops in the plurality of sets of crops from the emphasis of at least one subject in the image selection. The method further comprises selecting a set of crops as the set of cropped images based on a comparison of the cropping risk and the goal measure for each of the sets of crops.

BRIEF DESCRIPTION OF THE DRAWINGS

In the following, embodiments of the invention will be described, by way of example only and with reference to the drawings in which.

DETAILED DESCRIPTION

Figure 1:
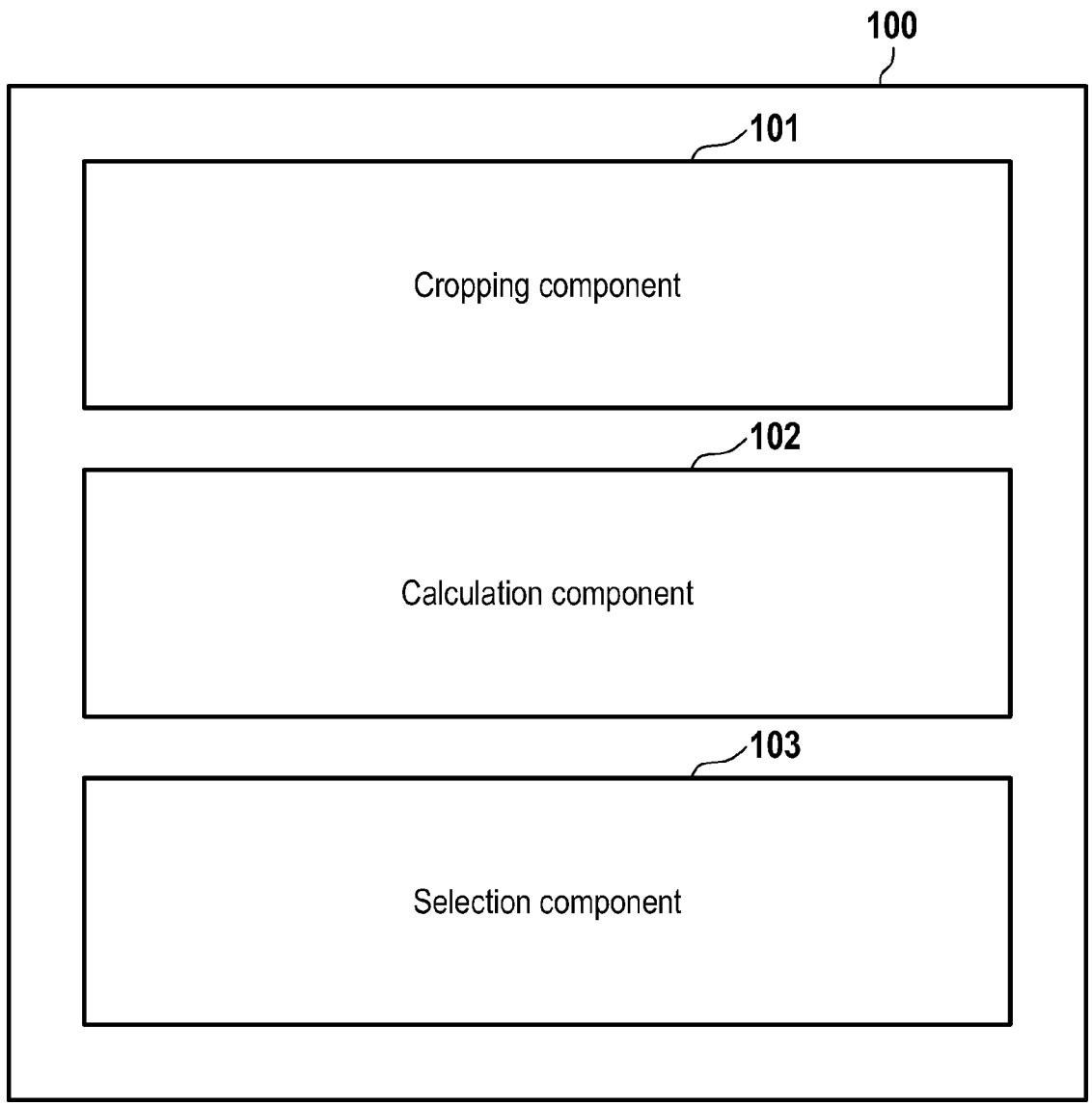
FIG. 1 is a block diagram of an image processing system.

FIG. 1 illustrates a block diagram of an image processing system 100. The image processing system 100 comprises a cropping component 101 for generating a set of crops from an image selection, a calculation component 102 for calculating a cropping risk and a goal measure for the set of crops, and a selection component 103 for selecting a set of crops based on the goal measure and the cropping risk.

The image processing system 100 receives a set of source images such as digital photographs, a set of templates, a cropping control signal, and a goal signal as inputs. Based on a set of templates, the cropping component 101 crops the set of images in order to obtain a number of cropped sets of images. Then the calculation component 102 uses the cropping control signal to determine a cropping risk for the sets of cropped images, and uses the goal signal to determine a goal measure for each of the sets of cropped images. The selection component 103 then uses the cropping risk and the goal measure to select one of the sets of cropped images. The set of cropped images may then be outputted for use in a presentation, a collage or a photograph album.

Images such as photographs often presented as collections in presentations, albums, and collages. Embodiments of the present invention allow cropping to be automatically carried out taking the relative positioning of photographs into account; This is in contrast to the prior art methods which consider images individually and do not take into account how images are presented.

The risk associated with cropping or the information lost through cropping can be distributed over an album or presentation. When calculating the risk associated with a crop, the degree of similarity with other images in the album or presentation can be taken into account. The degree of similarity can be calculated from an image histogram, the location or time that a picture was taken, cast based similarity can be used; pictures can be deemed to be similar in terms of the members of a predefined cast present in the pictures. Additionally the risk can be varied according to for example the persons present in a picture.

Figure 2:
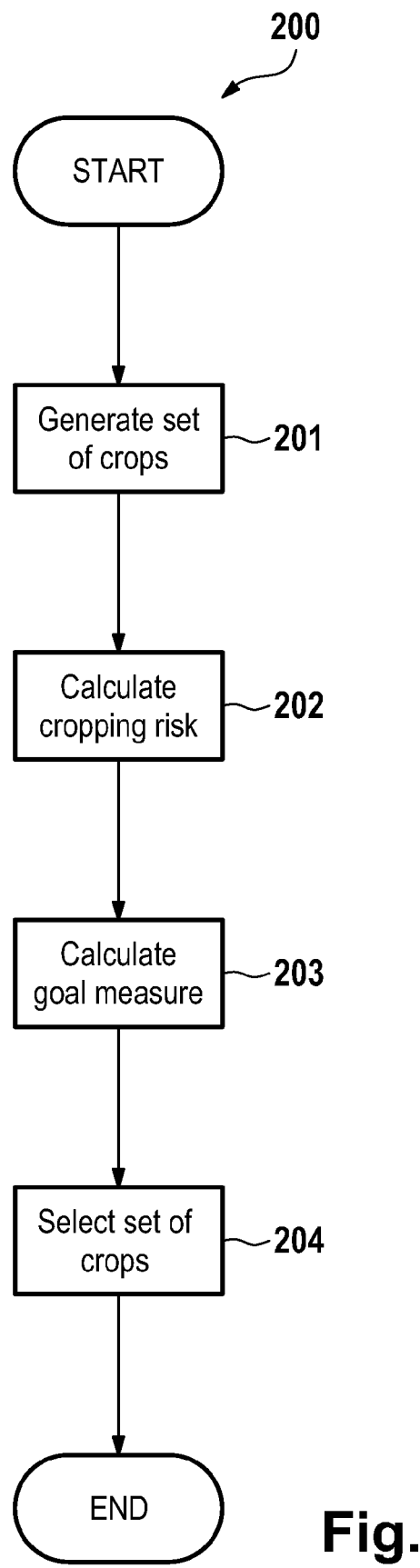
FIG. 2 is a flow diagram illustrating steps involved in a method of generating a set of cropped images from an image selection.

FIG. 2 shows a flowchart illustrating a method of generating a cropped set of images from an image selection 200. In step 201 a set of crops is generated from the image selection. In step 202 a cropping risk is calculated. The cropping risk is a measure of the lost information for the set of crops when compared with the original image selection. In step 203, a goal measure is calculated. The goal measure is a measure of how well the cropped image selection fulfils an aesthetic goal. In step 204, a set of crops is selected. The set of crops is selected in step 204 by making a comparison of the goal measure and the cropping risk.

Figure 3:
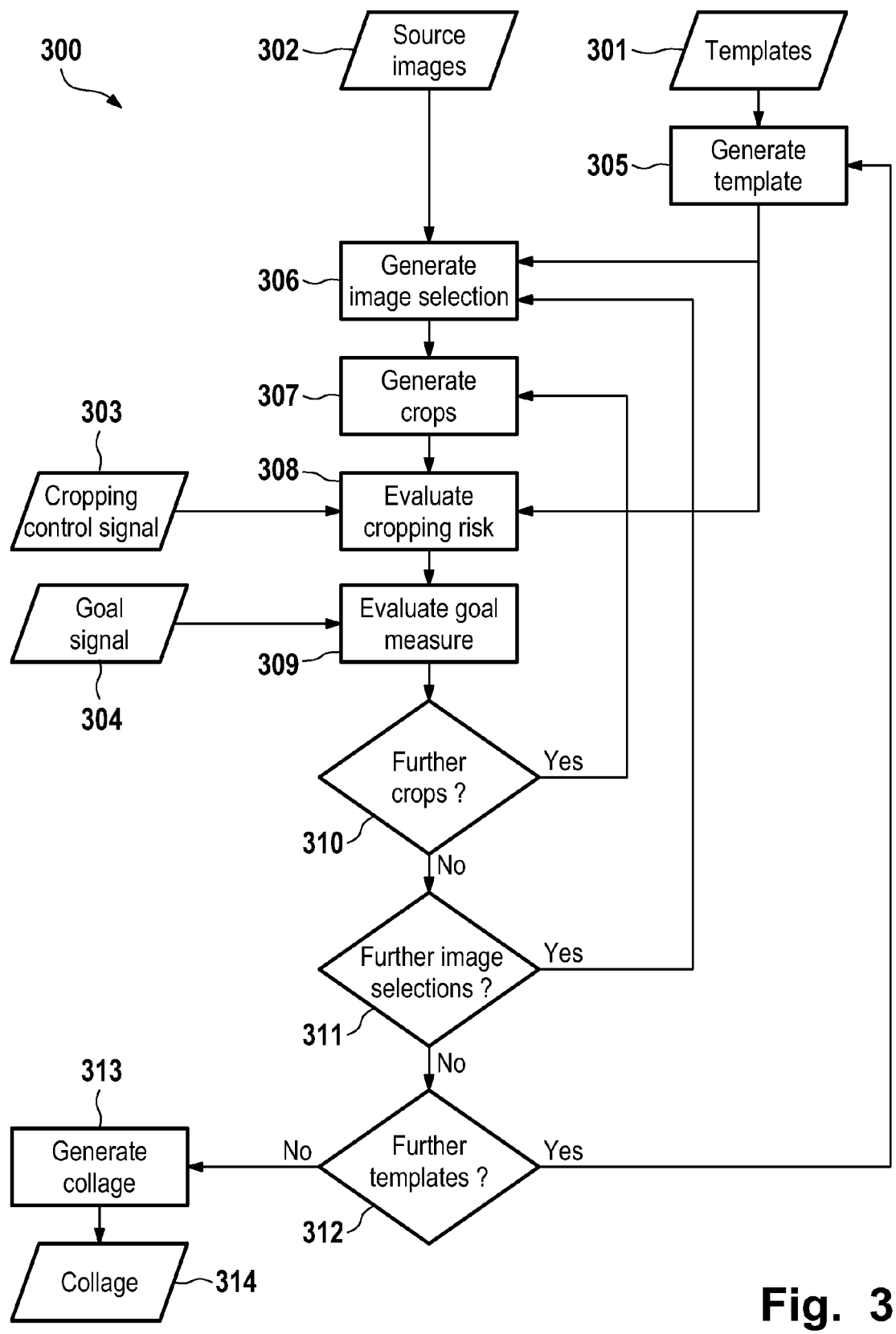
FIG. 3 is a flow diagram illustrating the steps involved in the selection of cropped images for inclusion in a collage.

FIG. 3 shows a flow diagram 300 showing a method of generating a collage from a set of source images. The inputs are a set of templates 301, a set of source images 302, a cropping control signal 303, and a goal signal 304. In step 305, a template is generated from the set of templates 301. In step 306, an image selection is generated from the set of source images 302 and the template generated in step 305. In step 307, a set of crops is generated from the image selection generated in step 306. In step 308, the cropping risk for the set of crops generated in step 307 is evaluated. The cropping control signal 303 is used in step 308 to evaluate the cropping risk. In step 309 a goal measure is evaluated using the goal signal 304. The goal measure is a measure of how well the cropped images generated in step 307 achieve a number of semantic or aesthetic goals. For example the goal signal 304 may specify cast members that is people who are to be given certain levels of emphasis in the cropped images. The emphasis may be measured by the ratio of areas of a cast member's face to the total image area. Such a cast emphasis system would require a recognition of faces of people in the source images 302, and a user input of the emphasis to be given to the cast members in the source images 302. In step 310 a determination is made as to whether to evaluate further crops. The basis for this may be whether the goal is achieved with an acceptable cropping risk. In step 311 a determination is made as to whether to evaluate further image selections and in step 312 a determination is made as to whether to evaluate further templates. In step 313 a collage, 314 is generated and output.

Figure 4:
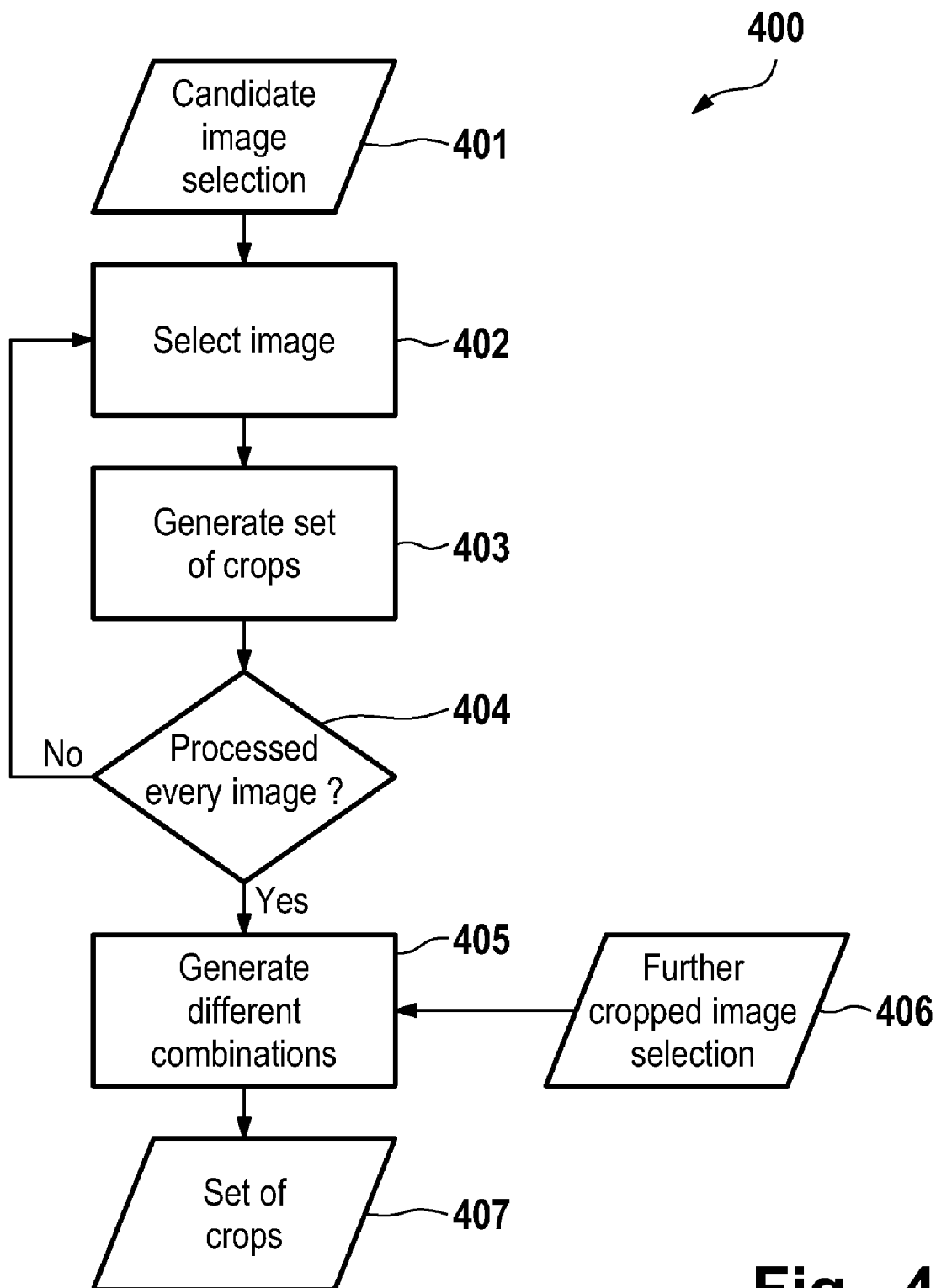
FIG. 4 is a flow diagram illustrating the steps involved in generating a set of crops from an image selection.

FIG. 4 shows a method for generating a set of crops from a candidate image selection. A candidate image selection 401 may have been generated in step 306 shown in FIG. 3. In step 402 an image is selected, and in step 403 a set of crops is generated. In step 404 a determination is made as to whether every image has been processed. And if every imaged has been processed, in step 405 different combinations of crops are generated. This may include input from further cropped image selection 406. The output is a set of crops 407.

Figure 5:
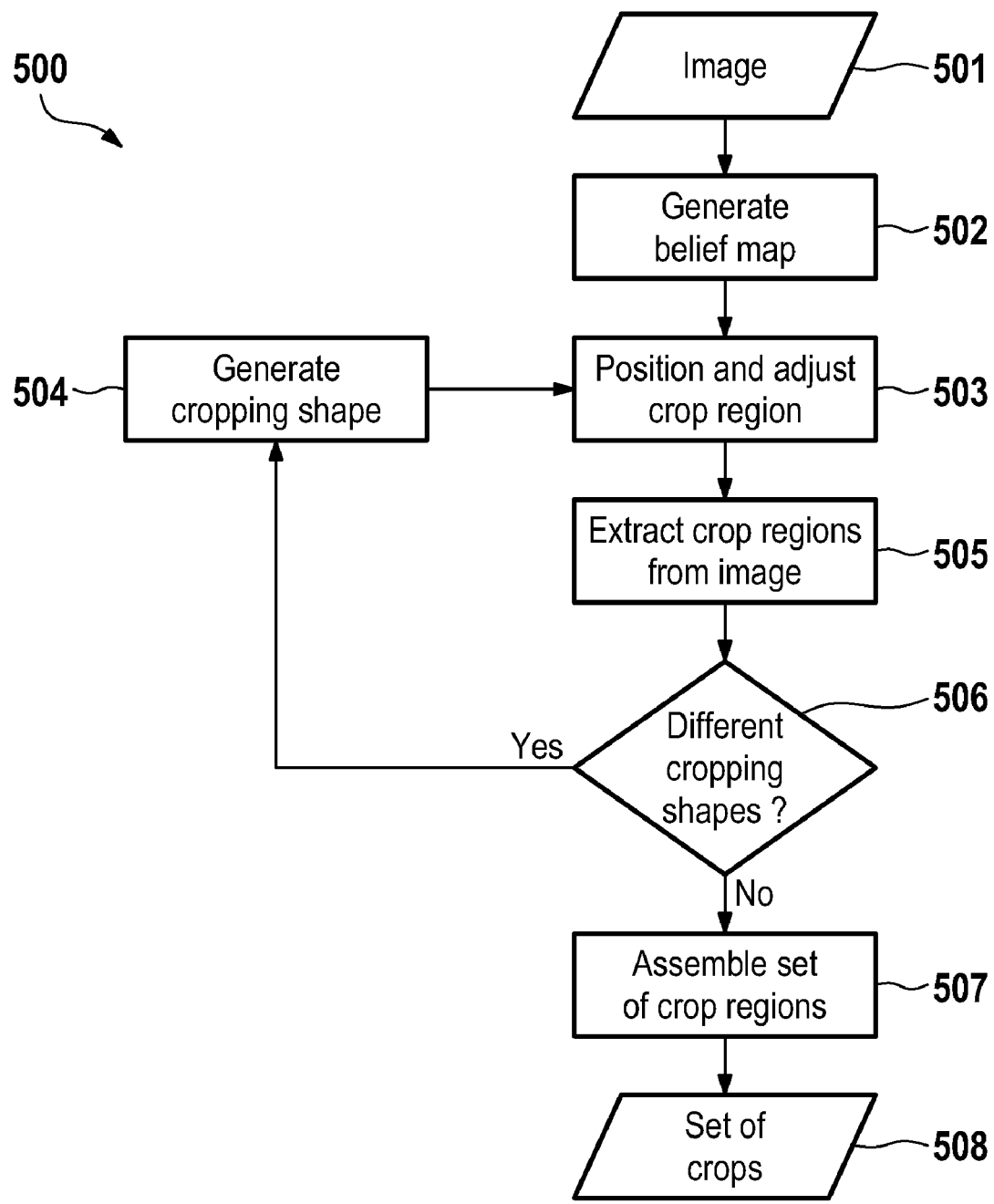
FIG. 5 is a flow diagram illustrating steps involved in generating a set of crops from an image.

FIG. 5 shows a method 500 for generating a set of crops 508 from an image 501 and provides more detail about step 403 in FIG. 4. In step 502, a belief map or a saliency map is generated of the image 501. This may include identifying important features of the image such as faces using a face detection algorithm. A belief map of an image is a likelihood that each section of the image contains the main subject of the image. In step 503 a crop region is positioned and adjusted. A crop region is determined using a cropping shape generated in step 504. In step 505 crop regions are extracted from the image in step 506, and determination is made as to whether to use different cropping shapes. In step 507 a set of crop regions is assembled, and output as a set of crops 508.

Figure 6:
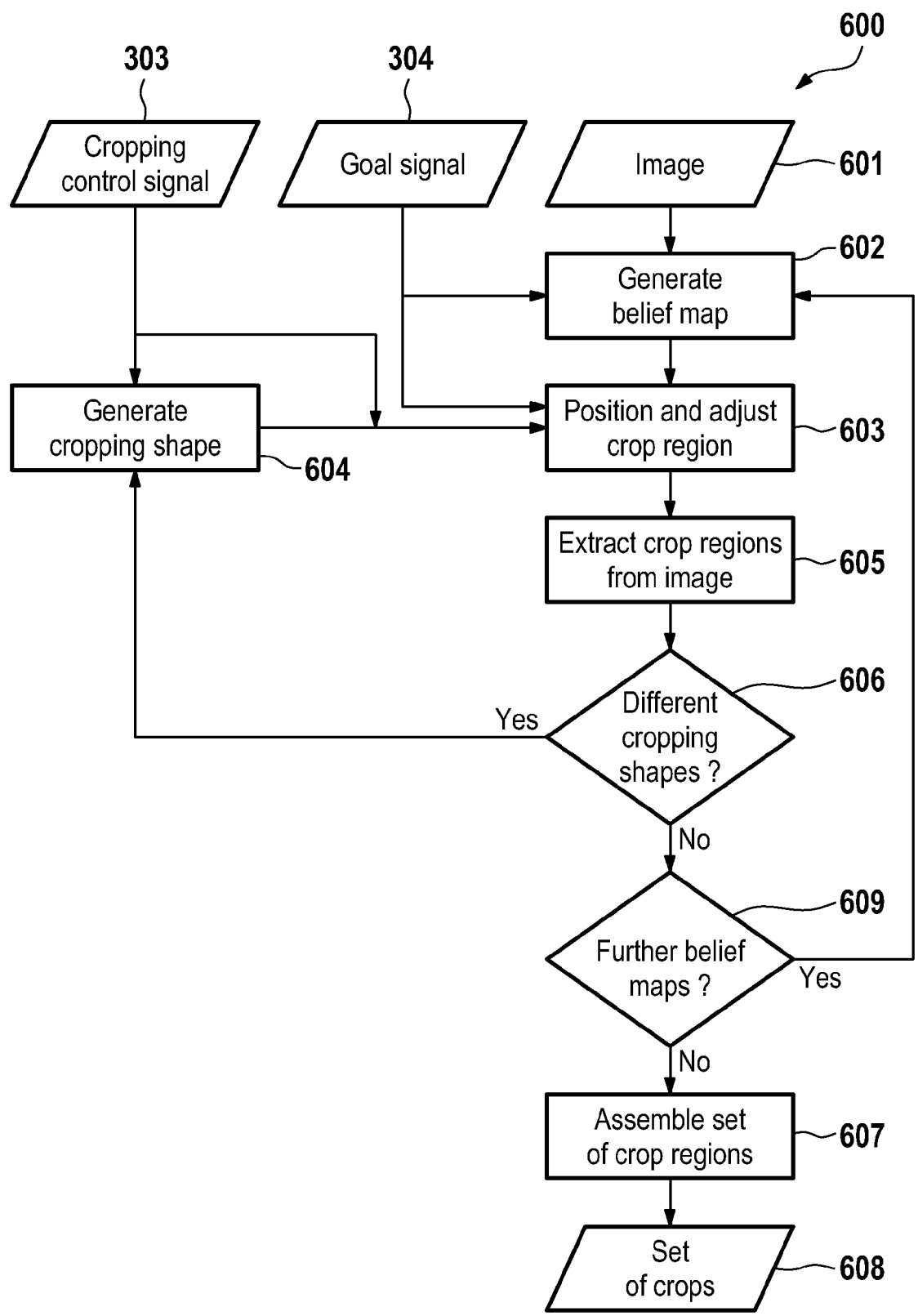
FIG. 6 is a flow diagram illustrating steps involved in a method of generating a set of crops from an image.

FIG. 6 shows a method of generating a set of crops using a cropping control signal 303 and the goal signal 304. In step 602, a belief map is generated of image 601 and the goal signal 304 is used to generate this belief map. The goal signal may include for example features of the image which should be ensured appear in the cropped image, for example, faces of a main subject, or other important features such as landmarks, these features may be selected by the user prior to executing the method. In step 603 the crop region is positioned and adjusted using the belief map to determine suitable positions. In step 604 a cropping shape is generated, this may include input from the cropping control signal 303. The cropping control signal 303 may also be used to control the positioning and adjustment of the crop region. In step 605 the crop regions are extracted from the image. And in step 606 a determination is made as to whether to use different cropping shapes. In step 609, a determination is made as to whether to use further belief maps. In step 607 a set of crop regions is assembled and output as a set of crops 608.

Figure 7:
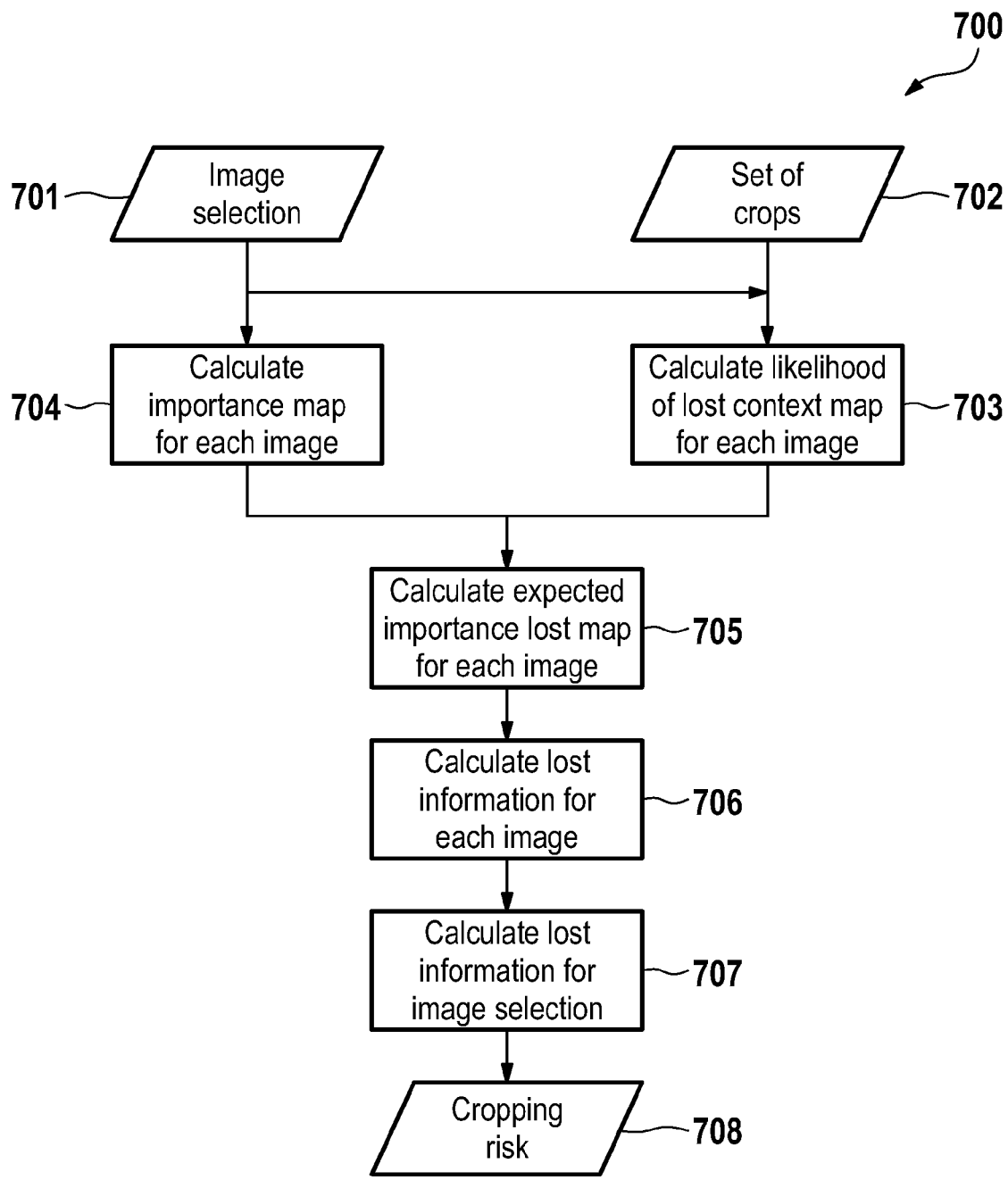
FIG. 7 is a flow diagram illustrating the steps involved in the calculation of a cropping risk.

FIG. 7 shows a method 700 of calculating a cropping risk 708 for a set of crops 702. The cropping risk 708 is a measure of the information lost from the image selection 701 in the set of crops 702. In step 703 a likelihood of lost context map is produced for each image (likelihoodlost(i)(x,y)) where x and y are the position coordinates on the ith image.

The likelihood of lost context map indicates the probability that the context given by a particular pixel in the original image will be lost in a particular presentation using the suggested crop selection. Thus the likelihood of lost context map has a value in the range 0-1 for each pixel of each original image. A value of 1 indicates that it is certain that the context provided by a pixel is lost. A value of 0 indicates that it is certain that the context is preserved.

There may be cases when the context is provided by other photographs or images presented in the presentation. If other images in the image selection include the context for pixels then the likelihood of lost context for a particular pixel may not be 1 even if it is outside the cropped area of an image in the set of crops 702. It can be determined when other images in the image selection provide some of the context for pixels in an image using for example, image registration, image similarity, the temporal closeness of pictures, a cast base image similarity or a semantic attribute based similarity. Thus cropping of group pictures or photographs of particular people may be allowed when photographs of the same people are presented on the same page or on the facing page of an album. When taking into account the likelihood of lost context the relative resolution of the pixels may to be taken into account.

In step 704, an importance map is calculated for each image. This indicates the importance of every pixel of each of the original images importance(i)(x,y). Thus the importance of the most important regions of an image could be set to a value near 1 and an important regions set to a value near 0. This may be achieved using a method of main subject detection or a saliency map. Main subject detection differentiates the subject from the background and regions of the field of view which are likely to attract a viewer's attention are scored more highly. A saliency map gives the result of how likely features are to attract the viewer's attention. Automatic face detection may be used to identify important regions which would be the detected faces of people. Particularly, key elements of the face such as the eyes, mouth and nose could be regarded as more important than other elements. Additionally faces may be identified and certain people given greater importance than other people. Different cropping risks may be undertaken depending on the particular people present in a picture. This could for example be based on a user selection of importance to be given to members of a cast. Thus a calculation of the importance in step 704 may include the input of the goal signal 304. Different cropping risk distributions may be defined for different types of pictures, for example pictures with a combination of a person or a particular person specified in a cast selection and a landscape or particular feature in the background may take different cropping risks to pictures showing the same background without the people. This allows pictures of particular importance to a story to be given a greater importance. Other attributes of an image may be used in the determination of importance, for example data identifying the photographer, a picture index, the time and the location a picture was taken.

In step 705 a map of expected importance lost is calculated for each image this being a pixel by pixel product of the importance map and the likelihood of lost context map for each image.

ExpectedImportance($i$)($x,y$)=importance($i$)($x,y$)*likelihoodlost($i$)($x,y$)

In step 706 a measure of the expected lost information for each image is calculated.

$$ExpectedLostInformation(i) = (1/npixels(i))\sum_{(x,y)} ExpectedImportance(i)(x, y)$$

This is the sum over all pixels of the expected importance lost divided by the number of pixels for each original image.

Then in step 707, the lost information for the image selection is calculated. This may be a weighted sum over all of the images of the expected lost information.

$$CroppingRisk = \sum_i w(i)*ExpectedLostInformation(i)$$

The weighting w(i) in step 707 can take into account the relative prominence of images when presented. The expected lost information calculated in step 707 is output as the cropping risk 708.

The likelihood lost map can produce simple measures to the risk posed by cropping. In particular, the measure of cropping risk may be calculated by taking the complement of the relative area of the cropped region to the area of the original image.

The crop region of the selected original image is to be used n he actual presentation and so the simplest approach is to set all these pixels to 0 because the context they provide is not lost.

∀$i$∈ Selection.

∀($x,y$)∈ CroppedRegion($i$).

likelihoodlost($i$)($x,y$)=0

The simplest control is to view the context provided by the discarded pixels as having been lost completely.

∀$i$∈ Selection.

∀($x,y$)∈ DiscardedRegion($i$).

likelihoodlost($i$)($x,y$)=1

If we also arrange the importance-map of the original image to be one for each pixel importance($i$)($x,y$)=1

Now performing the calculation outlined in FIG. 7 we obtain a measure indicative of the lost information set out below:

$$LostInformation(i) = 1 - \left(\frac{Area(croppedregion(i))}{Area(entireimage(i))}\right)$$

In the example given above, every pixel is regarded as being equally important in giving context. The importance map may be used to decide when significant context is lost. In step 704 of FIG. 7 an importance map is calculated for each image. An importance map indicates the importance of each of the original images. The most important regions of an image may be set to a value near to one and unimportant regions to a value near zero.

The importance map may be calculated using main subject detection, or a saliency map which models bottom-up attention. Saliency of an image or video stream indicates the probable location of visual attention of a viewer of the image or video. The visual attention process selects a portion of the available information from the visual environment. It allows the visual system to give more attention to salient regions and less attention to unimportant areas. Two general processes significantly influence visual attention, called bottom-up and top-down processes. The bottom-up process is purely stimulus driven. Some examples would include a candle burning in a dark room; a red ball among a number of blue balls; or sudden motions. The conspicuous visual stimulus captures attention automatically without volitional control. The top-down process, on the other hand, is a directed volitional process of focusing attention on one or more objects which are relevant to the observer's goal. Such goals may include looking for street signs or searching for a target. The attention drawn due to conspicuous stimuli may be deliberately ignored because they are not relevant to the observer's goal. The bottom-up process may be thought to provide the context for the top-down process, and so the bottom-up process can be though as fundamental to visual attention.

Main subject detection differentiates the subject from the background clutter. Regions within the field of view which are likely to attract a viewer's attention are scored more highly. The saliency map gives the result of competition for a viewer's attention and so does not have any absolute notion of importance, the importance is relative to the other points of attention in the field of view.

Automatic face detection provides an alternative another means of identifying important regions (the detected faces) which would attract the visual attention of a viewer. Larger faces have a larger visual impact than smaller faces. Elements of the face (the eye, mouth, nose) should be regarded as being more important than other elements. Similarly the identity of the person whose face has been detected will also influence the importance of the detected faces.

These importance maps are not dependent upon the intended presentation or story. The have cast of identified people in a presentation and the relative importance of these people should also be used to vary the importance map. Other semantic elements such as picture-type, location, activity, time of capture can be relevant to the goal of the presentation.

A goal signal which contains information related to the goal of the presentation could be included as an additional input to the method shown in FIG. 7. This input may feed into both the "calculation of the importance map" and the "likelihood of lost context map".

The importance map can be influenced by many factors and the importance map influences the likelihood of losing (significant) context. The importance map may provide a mechanism for allowing cropping of context that is not important to the story (as defined by the goal signal).

The controls may take into account that it is less damaging to lose context when other photos in the selection may provide some of the context. There are several means of determining when this occurs such as Image registration, Image similarity, Temporal closeness of pictures, Cast-based image similarity and Semantic-attribute-based similarity.

If the views from other photos in the selection can be registered with a photo then we can construct a mapping from pixels in this photo to pixels to others in the selection. This allows detection of when photos in a selection form an overlapping panorama of the scene, or when another photo provides a close-up view of part of the scene in another photo.

The common pixels to the photos can be used to mitigate the loss of context by cropping (providing these pixels are actually presented). When a common pixel is discarded by cropping the likelihood map for this pixel is not set to one to indicate that their context is lost, but its set to some other smaller value (for example 0.3). It should be set to a higher value if the common pixel is providing context for several other photos (for example 0.5). Similarly if there are several sources for the lost context it should be set to a lower value.

The relative resolution of the mapped pixels needs to be taken into account when mitigating the loss of context, i.e. a pixel from a low resolution view (wide field of view) of a scene provides context for several pixels from a high resolution views (narrow field of view).

However image registration of different camera views is affected by other objects moving (people in particular). Thus pixels of moving objects may not be mapped to corresponding pixels of the object and may not be suitable for providing context for discarded pixels.

However the same people (or objects) may be present in two photos. Thus photos of the same person in one photo can provide context for another photo (whether or not the camera views can be registered). This is more likely to be the case if the photo is taken closer in time to the other photo.

Temporal closeness between the two camera views may mean that the photos are more likely to provide context for the pixels discarded by cropping.

In the absence of image or object registration providing context for discarded pixels there can be similar regions in the two images (similar colors or texture or some other image similarity measure).

Cast-based image similarity determines how many common people are present in two photos and for the common people determines whether the visual impact of these people in the two photos is the same (usually this is a simplistic measure of the relative area of that persons face in each photo, but more sophisticated measures can be used).

This approach may be generalized for comparing the visual impact of arbitrary semantic attributes (other objects and attributes such as locations and activities in common).

Ideally the context provided by the other photos i:sa dependent on how they are presented. The size of the common pixels on an album page impacts how well they provide context for the discarded pixels. The common pixels might not be prominent enough to be noticed by a viewer and so would not mitigate the effects of discarding pixels. On the other hand common pixels presented prominently would have a greater effect of mitigating the effect of discarding pixels during cropping. Furthermore, the spatial position in the presentation of both the photo being cropped and the other photos (that are providing some of the context lost during cropping) can effect the binding or association of the two photos on the page. A photo presented closely to another photo will be better able to provide supporting context, whereas one further away will be less able to provide such context. A photo along the path of a viewers visual attention in a presentation will be better able to provide such context. The weight w(i) may be used to take into account this prominence in the presentation.

Furthermore, the act of selecting particular photos loses the context provided by the photos that are not selected, i.e. selection also comes with a cost.

Once the cropping risk has been calculated it must be balanced against a measure of how well the cropped face selection achieves a goal. A goal is given by the goal signal 304 and may for example be a measure of the relative prominence given to a number of cast members. In order to select a particular cropped image selection which gives a solution to the multiple objective problem of reducing the risk while maximizing the emphasis given to aspects of the presentation. This can be achieved by combining the multiple objectives into one scalar objective whose solution is a Pareto optimal point for the problem. Pareto optimal solutions are those which when evaluated produce vectors whose performance in one dimension cannot be improved without adversely affecting another dimension. Thus when looking for the best solution configurations which have a greater likelihood of losing context than a selection already found that provides the same or a better achievement of the goal can be discarded. A comparison of the likelihood of losing context against the achievement of the goal could consider cropping risks and goal measures within a certain neighbourhood to be the same. The neighbourhood would therefore determine a granularity for comparing potential image selections. Once the Pareto solutions have been found a decision as to which to use can be made. This could be done by for example having a maximum cropping risk to eliminate some of the crop selections or a minimum goal measure could also be used. The granularity of the neighbourhood for comparison i.e. the size of the neighbourhoods could be increased to reduce the set of potential cropped image sets.

The method shown in FIG. 3 for producing a collage could be adapted to produce a photograph album having a number of pages. With each page or pair of pages having different cropping control signals and goal signals in order to produce an album. Additionally a similar method could be used to produce a slide show in which images are shown one after the other and the likelihood of losing context could be determined partly from the temporal closeness of images.

Figure 8:
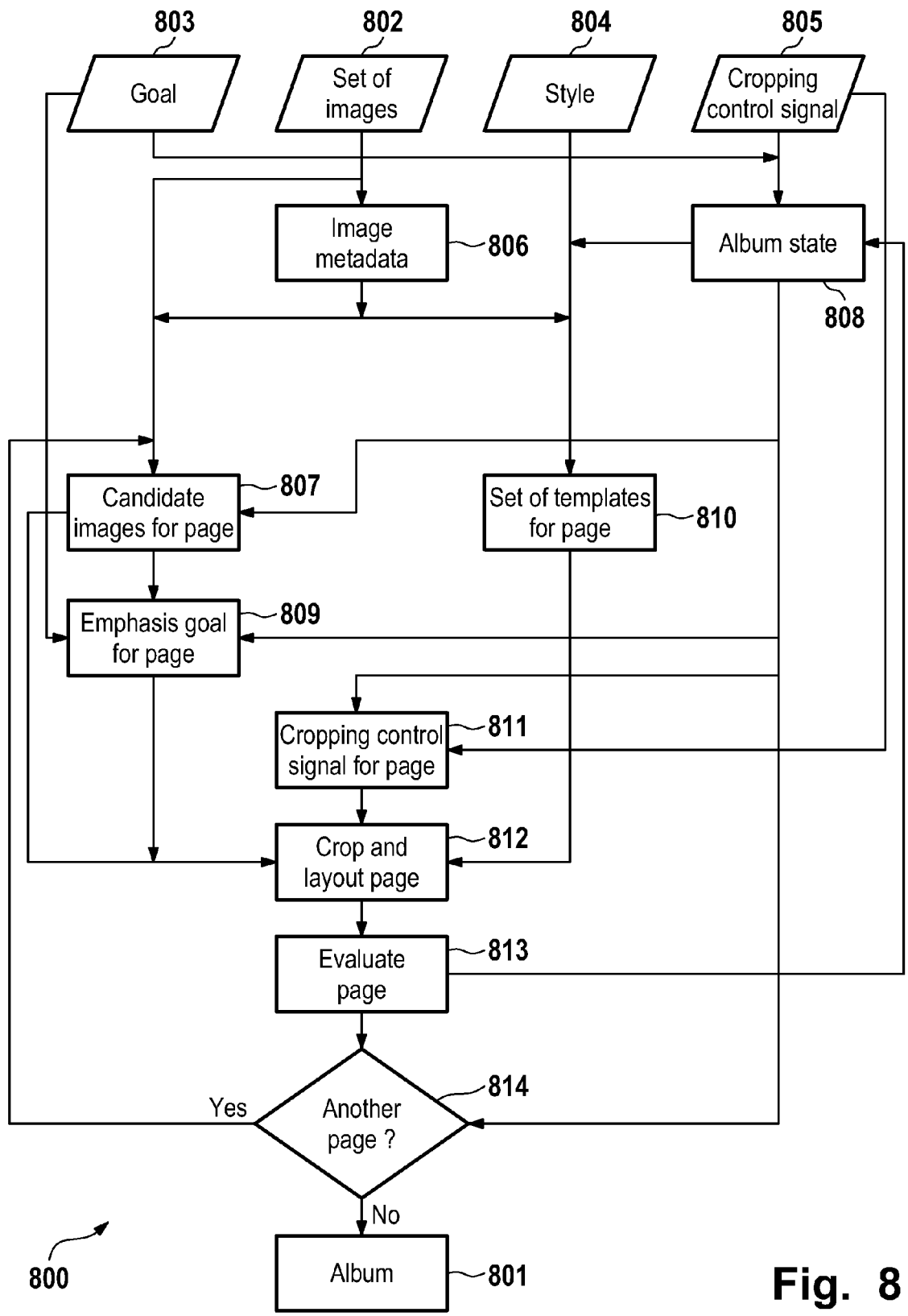
FIG. 8 is a flow diagram illustrating the steps involved in the selection and cropping of images for inclusion in an album.

FIG. 8 shows a method 800 of generating an album 801 from a set of images 802, with inputs of a goal 803, a style 804, and a cropping control signal 805. In step 806, image metadata is determined from image analysis and temporal clustering of the images. This allows candidate images for a page to be determined in step 807. The album state 808 has inputs of the cropping control signal 805, the goal signal 803, and once a page has been created, the album state is modified by the goal measure and cropping risk of the produced page. The album state therefore acts as to control the goal and cropping risk of an album over a number of pages. The album state 808, the goal 803 and the candidate images for the page are used to determine the emphasis goal for the page in 809. In 810, a set of templates for the page is determined. In 811, a cropping control signal for the page is calculated from the dropping control signal 805 for the album and the album state 808. This cropping control signal for the page, the candidate images for the page 807 and the emphasis goal for the page are used in 812 to crop and layout the page. The process used in 812 is analogous to the process outlined about with reference to FIG. 3 for the creation of a collage. In 813, the page is evaluated and a cropping risk signal and a goal progress signal are used to modify the album state 808. A determination is then made whether to process another album page in 814. If no further pages are to be output, the album 801 is output.

The method described above with reference to FIG. 8 allows the cropping risk to be controlled according to the album state 808. This allows albums to be created taking into account that different amounts of cropping may be appropriate at different times and points in an album for example less cropping may be undertaken at the start and end of an event cluster. The cropping and the information lost on one page of an album is taken into account when calculating the cropping and layout for further pages of the album.

The cropping control signal 303 in FIG. 3, FIG. 6 and 805 in FIG. 8 may be used to control the cropping in the methods and systems described above. The cropping control signal may control the proportion of images in a presentation that are cropped. The cropping control signal may control the total risk undertaken in the composition of a presentation and the distribution of the risk. The cropping control signal may define a mean risk per image on an album page. The cropping control signal may specify a standard deviation for the cropping risk on an album page. The cropping control signal may make the risk allowed dependent on the subjects of images and their importance to an overall story. The cropping control signal may allow cropping on the condition that there are similar images presented with the cropped images. The cropping control signal may control the cropping of group photographs based on a cast. The cropping control signal may control cropping based upon semantic attributes of the images such as a picture index, the capture time of an image, the location an image was taken, and the photographer.

The cropping controls contained in the cropping control signal may be independent of the goal of the presentation which may be dependent on similar objectives. The cropping controls allow greater cropping risks to be taken in certain circumstances, and the cropping control signal allows constraints to be expressed.

LIST OF REFERENCE NUMERALS

| | |
|---|---|
| 100 | Image processing system |
| 101 | Cropping component |
| 102 | Calculation component |
| 103 | Selection component |
| 200 | Method |
| 201 | Generate set of crops |
| 202 | Calculate cropping risk |
| 203 | Calculate goal measure |
| 204 | Select set of crops |
| 300 | Method |
| 301 | Templates |
| 302 | Source images |
| 303 | Cropping control signal |
| 304 | Goal signal |
| 305 | Generate template |
| 306 | Generate image selection |
| 307 | Generate crops |
| 308 | Evaluate cropping risk |
| 309 | Evaluate goal measure |
| 310 | Further crops? |
| 311 | Further image selections? |
| 312 | Further templates? |
| 313 | Generate collage |
| 314 | Collage |
| 400 | Method |
| 401 | Candidate image selection |
| 402 | Select image |
| 403 | Generate set of crops |
| 404 | Processed every image? |
| 405 | Generate different combinations |
| 406 | Further cropped image selections |
| 407 | Set of crops |
| 500 | Method |
| 501 | Image |
| 502 | Generate belief map |
| 503 | Position and adjust crop region |
| 504 | Generate cropping shape |
| 505 | Extract crop regions |
| 506 | Different cropping shapes? |
| 507 | Assemble set of crop regions |
| 508 | Set of crops |
| 600 | Method |
| 601 | Image |
| 602 | Position and adjust crop region |
| 603 | Generate cropping shape |
| 604 | Generate cropping shape |
| 605 | Extract crop regions from image |
| 606 | Different cropping shapes? |
| 607 | Assemble set of crop regions |
| 608 | Set of crops |
| 609 | Further belief maps |
| 700 | Method |
| 701 | Image selection |
| 702 | Set of crops |
| 703 | Calculate likelihood of lost context map |
| 704 | Calculate importance map |
| 705 | Calculate expected importance lost map |
| 706 | Calculate lost information for images |
| 707 | Calculate lost information for selection |
| 708 | Cropping risk |
| 800 | Method |
| 801 | Album |
| 802 | Set of images |
| 803 | Goal |
| 804 | Style |
| 805 | Cropping control signal |
| 806 | Image metadata |
| 807 | Candidate images for page |
| 808 | Album state |
| 809 | Emphasis goal for page |
| 810 | Set of templates for page |
| 811 | Cropping control signal for page |
| 812 | Crop and layout page |
| 813 | Evaluate page |
| 814 | Another page? |

The invention claimed is:

1. A method of generating a set of cropped images from an image selection comprising:

generating a plurality of sets of crops from the image selection;

calculating a cropping risk for each set of crops in the plurality of sets of crops by comparing the crops with the image selection, the cropping risk being a measure of lost information for the set of crops from the image selection;

calculating a goal measure for each set of crops in the plurality of sets of crops from the emphasis of at least one subject in the image selection;

selecting a set of crops as the set of cropped images based on a comparison of the cropping risk and the goal measure for each of the sets of crops.

2. The method of claim 1, further comprising the step of arranging each image of the set of cropped images on a page, wherein the step of calculating the cropping risk comprises taking into account the relative positions of the cropped set of images on the page.

3. The method of claim 2, further comprising the step of storing the cropping risk for use in the generation of a further page, wherein the page and the further page are to be included in an album.

4. The method of claim 1, wherein the plurality of sets of crops is generated according to a cropping control signal.

5. The method of claim 4 wherein the cropping control signal specifies a proportion of images in the image selection that are to be cropped.

6. The method of claim 4 wherein the cropping control signal specifies the total cropping risk allowed for a set of crops.

7. The method of claim 1, wherein the cropping risk is calculated by calculating a map of the likelihood of lost context for each pixel of each image in the image selection.

8. The method of claim 7, wherein the cropping risk is calculated from an expected importance map for each image in the image selection, the expected importance being calculated from a measure of the importance of each pixel each image multiplied by the likelihood of losing context for that pixel.

9. The method of claim 7, wherein calculation of the map of the likelihood of lost context for each pixel of each image in the image selection comprises determining whether a pixel appears in another image in the image selection.

10. The method of claim 1, wherein the at least one subject is a person and the step of calculating a goal measure comprises comparing the emphasis of the person with a user set weighting.

11. The method of claim 1, wherein the step of selecting a set of crops as the set of cropped images comprises determining a set of Pareto optimal solutions and selecting one of the set of Pareto optimal solutions as the set of cropped images.

12. An image processing system operable to produce a set of cropped images from an image selection comprising:
   a cropping component operable to produce a set of crops from the image selection;
   a calculation component operable to calculate a cropping risk and a goal measure for the set of crops;
   a selection component operable to select, using the cropping risk and the goal measure, a set of cropped images from a plurality of sets of crops.

13. The image processing system of claim 12, the cropping component comprising means to generate a saliency map for each image in the image selection and to crop the images using the saliency map.

14. The image processing system of claim 12, the calculation component operable to produce a map of the likelihood of lost context for each pixel of each image of the image selection.

15. The image processing system of claim 14, the calculation component further operable to receive a cropping control signal specifying the importance of each pixel of the image selection and to calculate an expected importance map from the importance of each pixel and the likelihood of lost context map.

16. The image processing system of claim 12, the calculation component operable to receive a goal signal.

17. The image processing system of claim 16, the goal signal specifying emphasis to be given to members of a cast, the cast being features in the image selection.

18. The image processing system of claim 12, further comprising storage for a cropping risk and a goal measure corresponding to a previous page in an album, the calculation component further operable to use the stored cropping risk and the stored goal measure to calculate the cropping risk and goal measure for the set of crops.

19. A non-transitory computer program product comprising instructions which when executed perform an image processing method comprising
   generating a set of crops from an image selection;
   calculating a cropping risk for the set of crops by comparing the crops with the image selection, the cropping risk being a measure of the lost information for the set of crops from the image selection;
   calculating a goal measure for the set of crops from the emphasis of at least one subject in the image selection.

20. The non-transitory computer program product of claim 19, the image processing method further comprising:
   selecting the set of crops from the image selection for inclusion in an album based on cropping risk and the goal measure.

* * * * *

UNITED STATES PATENT AND TRADEMARK OFFICE
CERTIFICATE OF CORRECTION

| | | |
|---|---|---|
| PATENT NO. | : 8,189,916 B2 | |
| APPLICATION NO. | : 12/184247 | |
| DATED | : May 29, 2012 | |
| INVENTOR(S) | : David Grosvenor | |

It is certified that error appears in the above-identified patent and that said Letters Patent is hereby corrected as shown below:

In column 6, line 14, delete "of" and insert -- of every pixel of --, therefor.

In column 11, line 23, in Claim 8, delete "pixel" and insert -- pixel of --, therefor.

Signed and Sealed this
Eleventh Day of December, 2012

David J. Kappos
*Director of the United States Patent and Trademark Office*